No. 857,589. PATENTED JUNE 25, 1907.
J. M. BOYLE.
MEANS AND METHOD FOR CONTINUOUSLY MAKING TUBE LINED MONOLITHIC HOLLOW OBJECTS.
APPLICATION FILED FEB. 20, 1907.
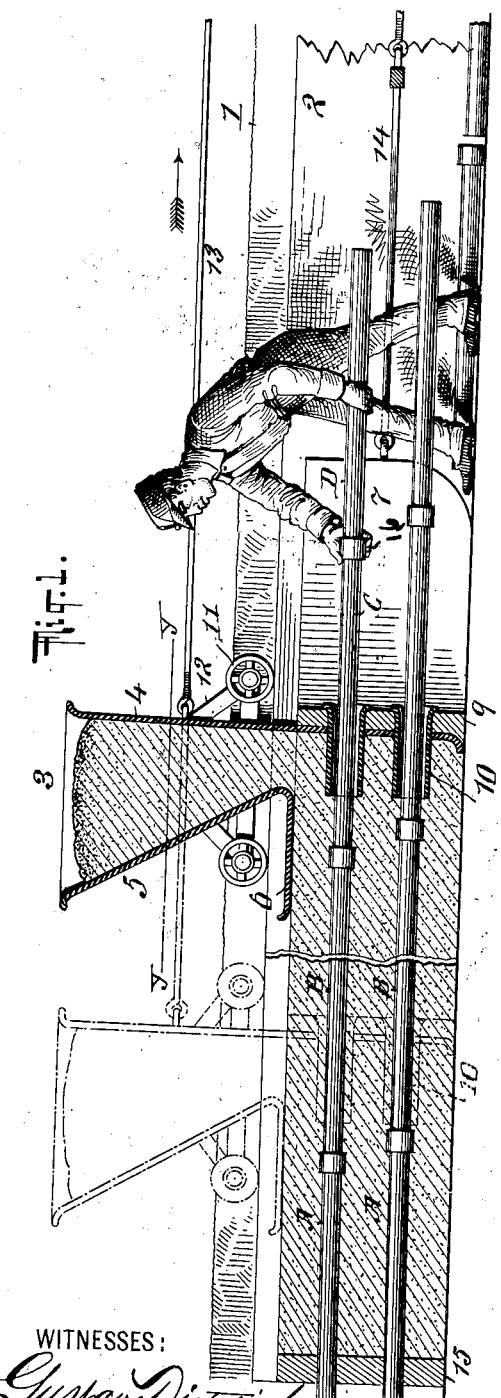
WITNESSES:
Gustave Dieterich.
Edwin F. Dieterich.
INVENTOR
James M. Boyle
BY Park Benjamin
his
ATTORNEY

UNITED STATES PATENT OFFICE.

JAMES M. BOYLE, OF NEW YORK, N. Y., ASSIGNOR TO MONOLITHIC DUCT COMPANY, A CORPORATION OF NEW YORK.

MEANS AND METHOD FOR CONTINUOUSLY MAKING TUBE-LINED MONOLITHIC HOLLOW OBJECTS.

No. 857,589.  Specification of Letters Patent.  Patented June 25, 1907.

Application filed February 20, 1907. Serial No. 358,428.

*To all whom it may concern:*

Be it known that I, JAMES M. BOYLE, a citizen of the United States, residing at New York, in the county of New York and State of New York, have invented a certain new and useful Improvement in Means and Methods for Continuously Making Tube-Lined Monolithic Hollow Objects, of which the following is a specification.

The invention relates to monolithic cement hollow objects having inserted tubular linings, and consists in the means and method hereinafter set forth for continuously and progressively making a tube lined monolithic cement conduit.

In the accompanying drawings—Figure 1 is a vertical section on the line $x\ x$ Fig. 2, showing the apparatus in place in the trench, and illustrating the mode of putting together the tube sections which are embedded in the cement conduit. Fig. 2 is plan view and partial section on the line $y\ y$ of Fig. 1.

Similar numbers of reference indicate like parts.

1 is a trench in which may be embedded the usual mold boards 2, which receive between them the deposited plastic material.

3 is a receptacle including a hopper portion, the front wall 4 of which extends to the bottom of the mold. The rear wall 5 has a horizontal flange 6, the purpose of which is to determine the depth of the deposited material and to smooth the upper surface thereof. In front of the hopper wall 4 may be secured the slide like former 7, having side pieces and a cross piece 9. Passing through the cross piece 9 and through the wall 4 and secured therein in any suitable way is a metal tube 10, or as shown a plurality of such tubes, which may, for example, as here shown, be arranged in two groups of three each.

The receptacle 3 is supported on trucks 11 journaled in suitable brackets 12, which run upon the edges of the mold.

The apparatus is drawn forward by a cord or wire 13 attached to the receptacle, or by cords or wires 14 attached to the former, or by both, as desired, said cord or cords being taken to any suitable stationary winding device, not shown.

I may dispense with the mold boards 2 and deposit the plastic material directly in the trench, in which case the side pieces of the former 7 serve to smooth the vertical surfaces of said trench, as fully explained in another application for Letters Patent, Serial No. 358,428 filed by me simultaneously herewith.

The operation of the device is as follows: The receptacle 3, dotted lines Fig. 1, being brought to the end of the mold or trench from which work is to begin, a section A (or two or more connected sections A, B,) of pipe which is to form the tubular lining of the conduit is introduced through a guide tube 10 and held in position by any suitable means, as by passing through an end cross wall 15. The plastic material is then shoveled into the hopper while the receptacle 3 is continuously drawn forward by the cords or wires 13, 14. The material then fills the trench or mold until it reaches the flange 6, which, as before stated, thus limits its depth and smooths the upper surface. Before the receptacle reaches the end of the inserted, or last inserted, tube section, a tube section C is connected by any suitable union 16, and then another section D, and so on. The workman in the drawing is represented as connecting section D to section C. Where there are a number of inserted tubes the unions or joints are preferably placed staggered as shown in Fig. 1.

The inserted tube sections may be of any suitable material such as india-rubber, gutta-percha or the various known insulating compounds.

By the foregoing device I am enabled rapidly to make tube lined cement conduits continuously in the place where they are to remain.

I claim:—

1. A stationary open mold, a tube supported in fixed position therein, a device for depositing plastic material in said mold to embed said tube and means for continuously moving said device along the length of said mold.

2. A stationary open mold, a plurality of parallel tubes supported in fixed position therein, a device for depositing plastic material in said mold to embed said tubes and means for continuously moving said device along the length of said mold.

3. The method of making tube-lined cement conduits which consists in continuously and progressively depositing plastic material in an open stationary mold upon a fixed lining tube supported in said mold.

4. The method of making tube-lined cement conduits which consists in continuously and progressively depositing plastic material in an open stationary mold and upon a fixed lining tube supported therein, then attaching to the end of said tube a second tube, and continuing the deposit as before, and so on indefinitely.

In testimony whereof I have affixed my signature in presence of two witnesses.

JAMES M. BOYLE.

Witnesses:
WM. H. SIEGMAN,
GERTRUDE T. PORTER.